(12) United States Patent
Su et al.

(10) Patent No.: US 8,193,733 B2
(45) Date of Patent: Jun. 5, 2012

(54) LED DRIVER CIRCUIT

(75) Inventors: Wei-Chuan Su, Taipei (TW);
Chia-Chieh Hung, Taipei (TW);
Ko-Yen Lee, Taipei (TW)

(73) Assignee: Immense Advance Technology Corp., Taipei (TW)

( * ) Notice: Subject to any disclaimer, the term of this patent is extended or adjusted under 35 U.S.C. 154(b) by 195 days.

(21) Appl. No.: 12/849,965

(22) Filed: Aug. 4, 2010

(65) Prior Publication Data

US 2012/0032614 A1 Feb. 9, 2012

(51) Int. Cl.
*H05B 37/02* (2006.01)

(52) U.S. Cl. ........ 315/291; 315/297; 315/308; 315/310; 315/311

(58) Field of Classification Search .................. 315/291, 315/294, 297, 307–308, 310–311
See application file for complete search history.

(56) References Cited

U.S. PATENT DOCUMENTS

| | | | | |
|---|---|---|---|---|
| 6,636,003 B2* | 10/2003 | Rahm et al. | ................ | 315/179 |
| 6,858,994 B2* | 2/2005 | Vollrath | ................ | 315/200 A |
| 7,759,881 B1* | 7/2010 | Melanson | ................ | 315/307 |
| 8,120,201 B2* | 2/2012 | Fujino | ................ | 307/10.8 |
| 2006/0279228 A1* | 12/2006 | Kato | ................ | 315/193 |
| 2008/0203946 A1* | 8/2008 | Ito et al. | ................ | 315/307 |
| 2009/0134817 A1* | 5/2009 | Jurngwirth et al. | ................ | 315/307 |
| 2009/0230883 A1* | 9/2009 | Haug | ................ | 315/297 |
| 2010/0181925 A1* | 7/2010 | Ivey et al. | ................ | 315/224 |
| 2010/0277092 A1* | 11/2010 | Menegazzi et al. | ................ | 315/291 |

* cited by examiner

*Primary Examiner* — Jason M Crawford
(74) *Attorney, Agent, or Firm* — Shimokaji & Associates, P.C.

(57) ABSTRACT

A novel LED driver circuit, including: a current regulation circuit, having a first end and a second end, wherein a first current is flowing into the second end, and a voltage difference between the first end and the second end is generated in response to the first current; a transistor, coupled with the first end and second end of the current regulation circuit; a bias network, having a first end and a second end, the second end being coupled with the transistor; and a LED module, having at least two connection nodes, wherein the connection node at one end of the LED module is coupled to a line voltage, the connection node at the other end of the LED module is coupled to the transistor, and one of the at least two connection nodes is coupled with the first end of the bias network.

10 Claims, 8 Drawing Sheets

LED DRIVER CIRCUIT

BACKGROUND OF THE INVENTION

1. Field of the Invention

The present invention relates to a LED driver circuit, and more particularly to a LED driver circuit capable of providing a regulated load current and a TRIAC holding current for dimmable LED lighting applications.

2. Description of the Related Art

In a LED lighting application utilizing an AC power source, the load current for a LED module has to be regulated to not only provide a stable lighting but also protect the LED module.

FIG. 1 illustrates a prior art LED driver circuit having a simple architecture. As illustrated in FIG. 1, the LED driver circuit includes a resister 110 and a LED module 120, and a line voltage $V_{IN}$ is applied to provide a load current $I_L$. The resistance of the resistor 110 is determined according to the maximum of the line voltage $V_{IN}$, and both the minimum voltage dropt and the maximum rated current of the LEDs in the LED module 120 as well, to protect the LED module. However, there are two disadvantages in this prior art LED driver circuit. First, the load current $I_L$ is varied with the line voltage $V_{IN}$. Second, to provide better illumination, all the LEDs in the LED module 120 have to be specially sorted to have a centralized load current distribution of which the mean is close to the maximum rated current, and this will increase the cost.

One solution to make the load current independent of the line voltage in the LED lighting applications is utilizing a switching-power-supply architecture. Please refer to FIG. 2, which illustrates a prior art LED driver circuit including a LED driver controller. As illustrated in FIG. 2, the LED driver circuit includes a LED driver controller 200, an NMOS transistor 201, an inductor 202, a diode 203, a resistor 210, and a LED module 220.

The LED driver controller 200 is used to generate a gating signal $V_G$ to drive the NMOS transistor 201 in response to a current sensing signal $V_{CS}$, to regulate the current sensing signal $V_{CS}$, and thereby the current of the LED module 220. However, this architecture is not appropriate for small power applications due to cost issue—the LED driver controller 200 and the inductor 202 are expensive for small power LED lighting applications.

To reduce the cost for small power LED lighting applications, one solution is using a LDO (Low Dropout) regulator. Please refer to FIG. 3, which illustrates a prior art LED driver circuit utilizing a LDO regulator. As illustrated in FIG. 3, the circuit includes a LDO regulator 300, a resistor 310, and a LED module 320. The LDO regulator 300 is in series with the LED module 320 to generate a regulated output voltage $V_O$ independent of a line voltage $V_{IN}$, and thereby a regulated load current $I_L$. However, as the line voltage $V_{IN}$ is a high voltage—for example 220V, the LDO regulator 300 has to be a high-voltage product manufactured by a high-voltage process, which is more expensive than a low-voltage process.

In view of the problems mentioned above, the present invention proposes a novel LED driver circuit with low-cost components to regulate the load current.

SUMMARY OF THE INVENTION

One objective of the present invention is to propose a novel LED driver circuit for small power LED lighting applications, to provide a regulated load current.

Another objective of the present invention is to propose a novel LED driver circuit for small power LED lighting applications, to provide a cost effective solution.

Still another objective of the present invention is to propose a novel LED driver circuit for small power LED lighting applications, which itself can also provide a current path for a TRIAC holding current.

To achieve the foregoing objectives of the present invention, a novel LED driver circuit is proposed, the circuit including: a current regulation circuit, a transistor, a bias network, a LED module, and a bypass network.

The current regulation circuit has a first end coupled to the transistor and the bias network respectively, a second end coupled to the transistor, and a third end coupled to the bypass network, wherein a first current is flowing into the second end, a second current is flowing into the third end, and a voltage difference between the first end and the second end is generated according to the sum of the first current and the second current in a way that the voltage difference becomes larger/smaller as the sum of the first current and the second current goes down/up.

The transistor has a first end coupled to the LED module, a second end coupled to the first end of the current regulation circuit, and a third end coupled to the second end of the current regulation circuit, wherein the current flowing out of the third end of the transistor will become larger/smaller as the voltage difference between the second end and the third end of the transistor increases/decreases.

The bias network has a first end coupled to the LED module, and a second end coupled respectively to the second end of the transistor and the first end of the current regulation circuit to provide a bias current path.

The LED module has at least one LED and at least two connection nodes, wherein the node at one end of the LED module is coupled respectively to a line voltage and the bypass network, the node at the other end of the LED module is coupled to the first end of the transistor, and one of the connection nodes is coupled to the first end of the bias network.

The bypass network has a first end coupled to the line voltage, and a second end coupled to the third end of the current regulation circuit to provide a bypass current path.

When the LED driver circuit of the present invention is in operation, the sum of the first current and the second current will be regulated according to a predetermined value, with the transistor being controlled by the current regulation circuit.

To make it easier for our examiner to understand the objective of the invention, its structure, innovative features, and performance, we use preferred embodiments together with the accompanying drawings for the detailed description of the invention.

DETAILED DESCRIPTION OF THE PREFERRED EMBODIMENTS

The present invention will be described in more detail hereinafter with reference to the accompanying drawings that show the preferred embodiment of the invention.

Figure 1:
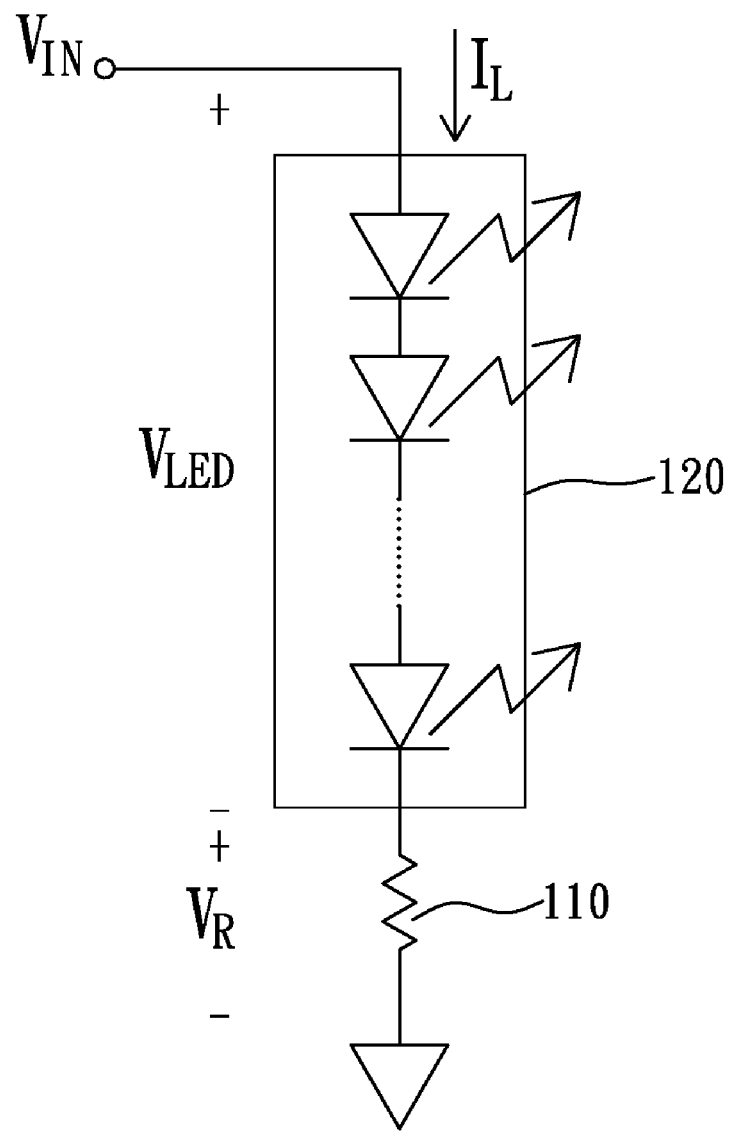
FIG. 1 illustrates a prior art LED driver circuit.
Figure 2:
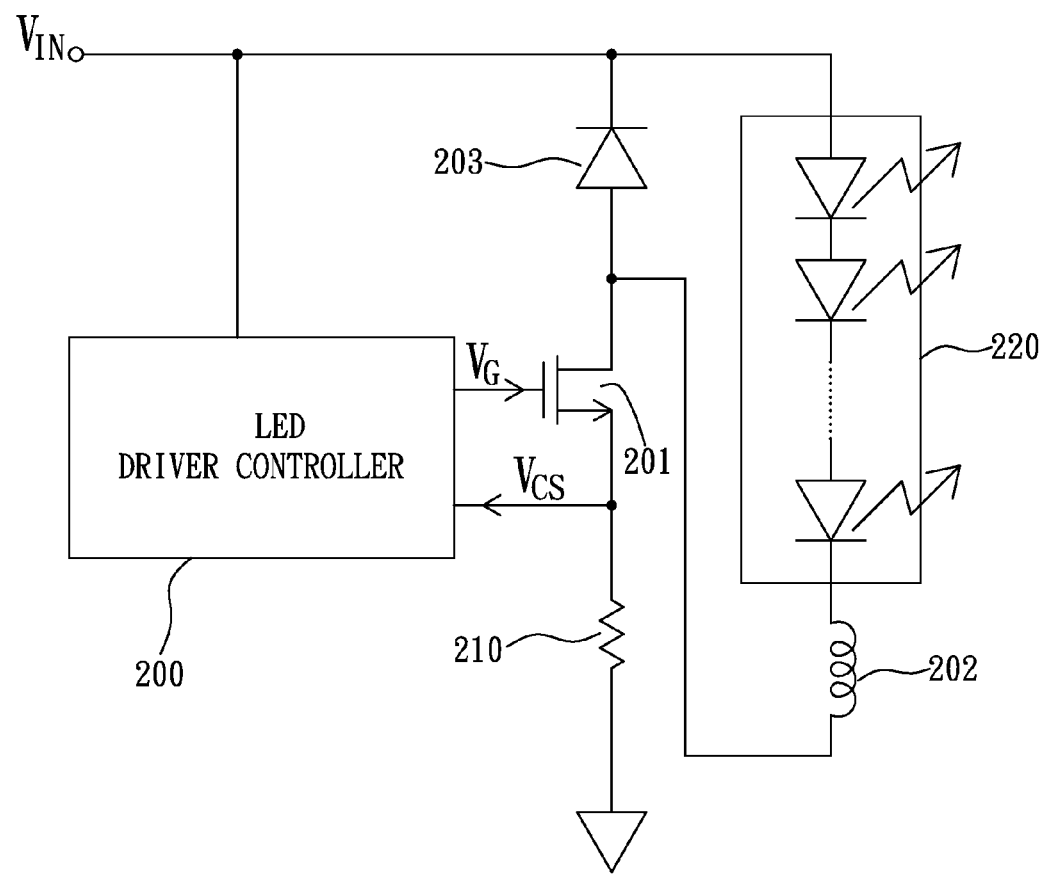
FIG. 2 illustrates another prior art LED driver circuit.
Figure 3:
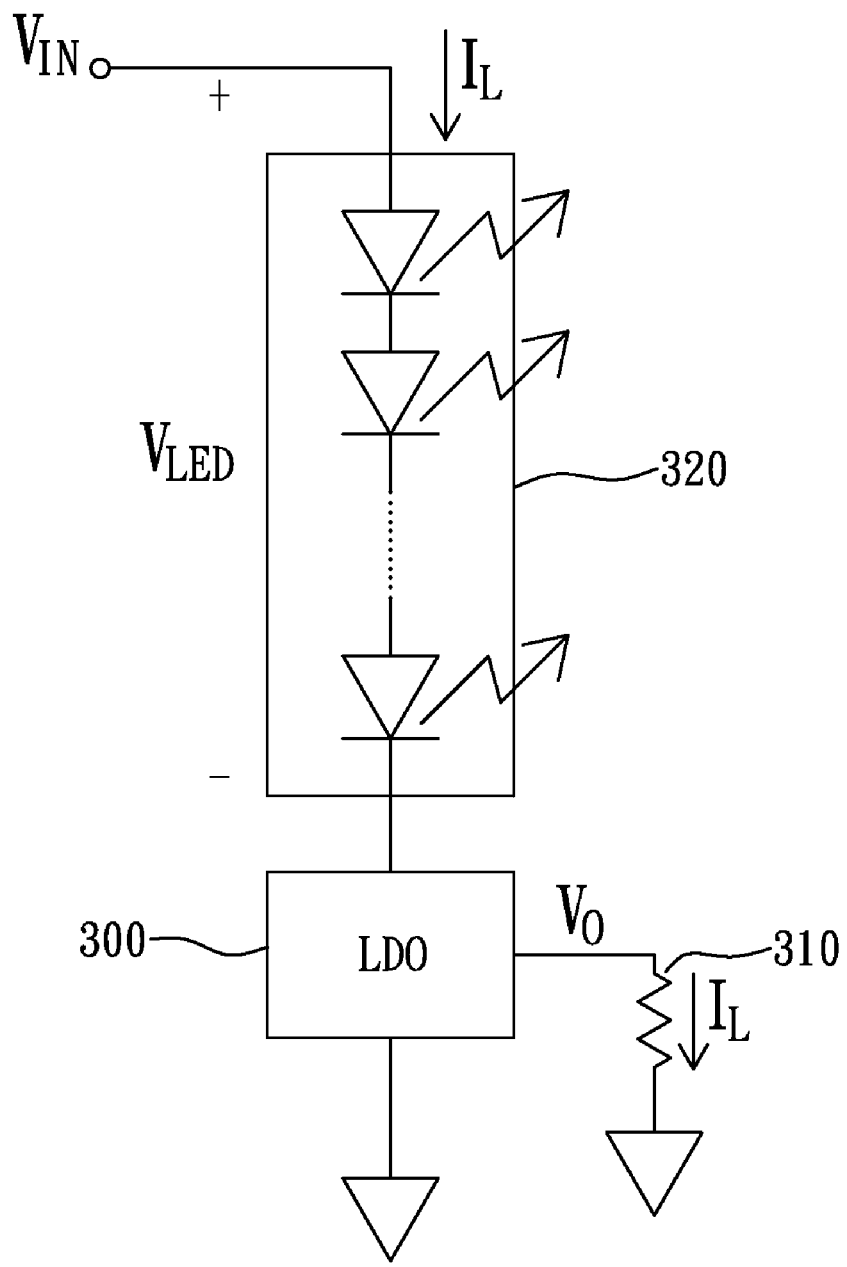
FIG. 3 illustrates still another prior art LED driver circuit.
Figure 4:
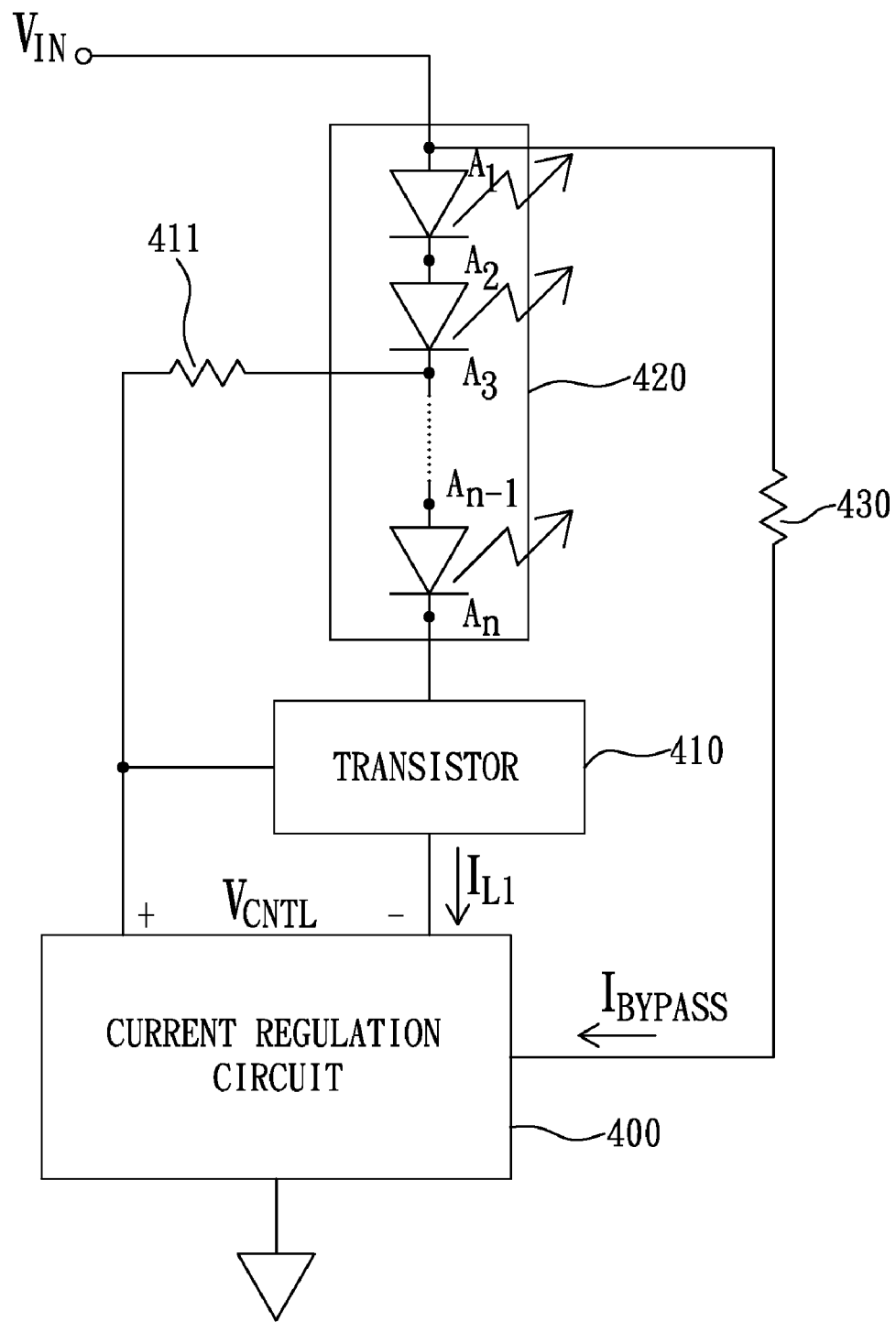
FIG. 4 illustrates the block diagram of a novel LED driver circuit according to a preferred embodiment of the present invention.

Please refer to FIG. 4, which illustrates the block diagram of a novel LED driver circuit according to a preferred embodiment of the present invention. As illustrated in FIG. 4, the LED driver circuit includes a current regulation circuit 400, a transistor 410, a resistor 411, a LED module 420, and a resistor 430.

The current regulation circuit 400 has a first end coupled to the transistor 410 and the resistor 411 respectively, a second end coupled to the transistor 410, and a third end coupled to the resistor 430, wherein a first current $I_{L1}$ is flowing into the second end, a second current $I_{BYPASS}$ is flowing into the third end, and a voltage difference $V_{CNTL}$ between the first end and the second end is generated according to the sum of the first current $I_{L1}$ and the second current $I_{BYPASS}$ in a way that the voltage difference $V_{CNTL}$ becomes larger/smaller as the sum of the first current $I_{L1}$ and the second current $I_{BYPASS}$ goes down/up.

The transistor 410, a high voltage transistor, has a first end coupled to the LED module 420, a second end coupled to the first end of the current regulation circuit 400, and a third end coupled to the second end of the current regulation circuit 400, wherein the current flowing out of the third end of the transistor 410, equal to $I_{L1}$, will become larger/smaller as the voltage difference between the second end and the third end of the transistor, equal to $V_{CNTL}$, goes larger/smaller.

The resistor 411, acting as a bias network, has a first end coupled to the LED module 420, and a second end coupled respectively to the second end of the transistor 410 and the first end of the current regulation circuit 400 to provide a bias current path.

The LED module 420 has at least one LED and at least two connection nodes—$A_1$, $A_2$, $A_3$~$A_n$, wherein the node $A_1$ at one end of the LED module 420 is coupled respectively to the resistor 430 and a line voltage $V_{IN}$—regulated from an AC power, the node $A_n$ at the other end of the LED module 420 is coupled to the first end of the transistor 410, and one of the connection nodes, for example $A_3$, is coupled to the first end of the resistor 411. It is to be known that the resistor can couple to any node of the LED module 420.

The resistor 430, acting as a bypass network, has a first end coupled to the line voltage $V_{IN}$, and a second end coupled to the third end of the current regulation circuit 400 to provide a bypass current path. It is to be known that the resistor 430 is not a necessary component of the present invention, that is, the circuit of the present invention without the resistor 430 can also work well.

When the LED driver circuit of the present invention is in operation, the sum of the first current $I_{L1}$ and the second current $I_{BYPASS}$ will be regulated according to a predetermined value, with the transistor 410 being controlled by the current regulation circuit 400. The drift of the average current of the first current $I_{L1}$ caused by the variation of the line voltage $V_{IN}$, for example changing from 220V to 240V, can be reduced by the bypass effect of the second current $I_{BYPASS}$ flowing through the resistor 430. Besides, the resistor 411 can also provide a TRIAC holding current path to keep a TRIAC remain turned on—a TRIAC will be turned off if the channel current of the TRIAC falls below a holding current—when the line voltage $V_{IN}$ is sent out from a TRIAC circuit inside a wall-dimmer. As such, the LED driver circuit of the present invention is compatible to a fluorescent lamps module in a traditional TRIAC-dimming lighting application, that is, the fluorescent lamps module—controlled by a wall-dimmer using a TRIAC circuit—can be replaced with the LED driver circuit of the present invention, which can work well with the TRIAC circuit.

There are a variety of embodiments for implementing the current regulation circuit 400 and the transistor 410. The circuits in FIG. 5-8 are illustrative examples, and many other configurations are possible.

Figure 5:
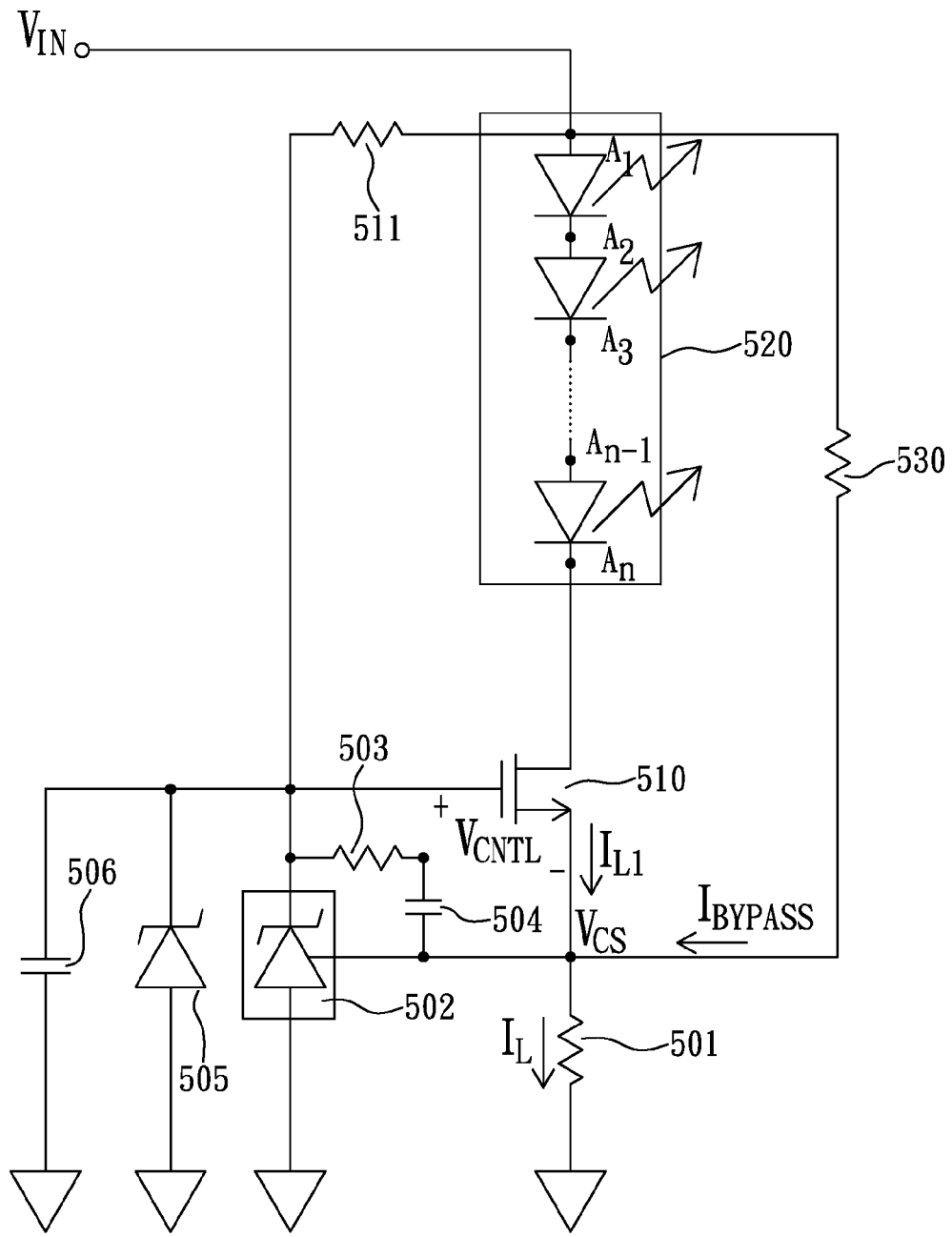
FIG. 5 illustrates the circuit diagram of a novel LED driver circuit according to a preferred embodiment of the present invention.

Please refer to FIG. 5, which illustrates the circuit diagram of a novel LED driver circuit according to a preferred embodiment of the present invention. As illustrated in FIG. 5, the LED driver circuit includes a resistor 501, a shunt regulator 502, a resistor 503, a capacitor 504, a zener diode 505, a capacitor 506, a NMOS transistor 510, a resistor 511, a LED module 520, and a resistor 530.

The resistor 501 is used to generate a current sensing voltage $V_{CS}$ according to a current $I_L$ ($=I_{L1}+I_{BYPASS}$).

The shunt regulator 502 has an input end coupled to the current sensing voltage $V_{CS}$ and an output end coupled to the gate terminal of the NMOS transistor 510, wherein the voltage at the output end is an inverting amplification of the difference of the current sensing voltage $V_{CS}$ and a reference voltage (provided inside the shunt regulator 502).

The resistor 503 and the capacitor 504 are used for frequency compensation of the shunt regulator 502.

The zener diode 505 is used to protect the shunt regulator 502, and the capacitor 506 is used with the shunt regulator 502 to build up a stable bias voltage at the gate terminal of the NMOS transistor 510.

The NMOS transistor 510, a high voltage enhancement-mode NMOS transistor, is used to provide $I_{L1}$ according to a voltage difference $V_{CNTL}$ between the gate terminal and the source terminal of the NMOS transistor 510.

The functions of the resistor 511, the LED module 520, and the resistor 530 are same as those of the resister 411, the LED module 420, and the resistor 430 in FIG. 4, so they will not be elaborated upon here.

When in operation, the shunt regulator 502 will vary the voltage of $V_{CNTL}$ in response to the difference of the current sensing voltage $V_{CS}$ and the reference voltage (provided inside the shunt regulator 502) to vary the current of $I_{L1}$, so as to regulate the current sensing voltage $V_{CS}$. That is, the current of $I_{L1}$ will be decreased (increased) by this negative feedback mechanism when $V_{CS}$ is above (below) the reference voltage.

Figure 6:
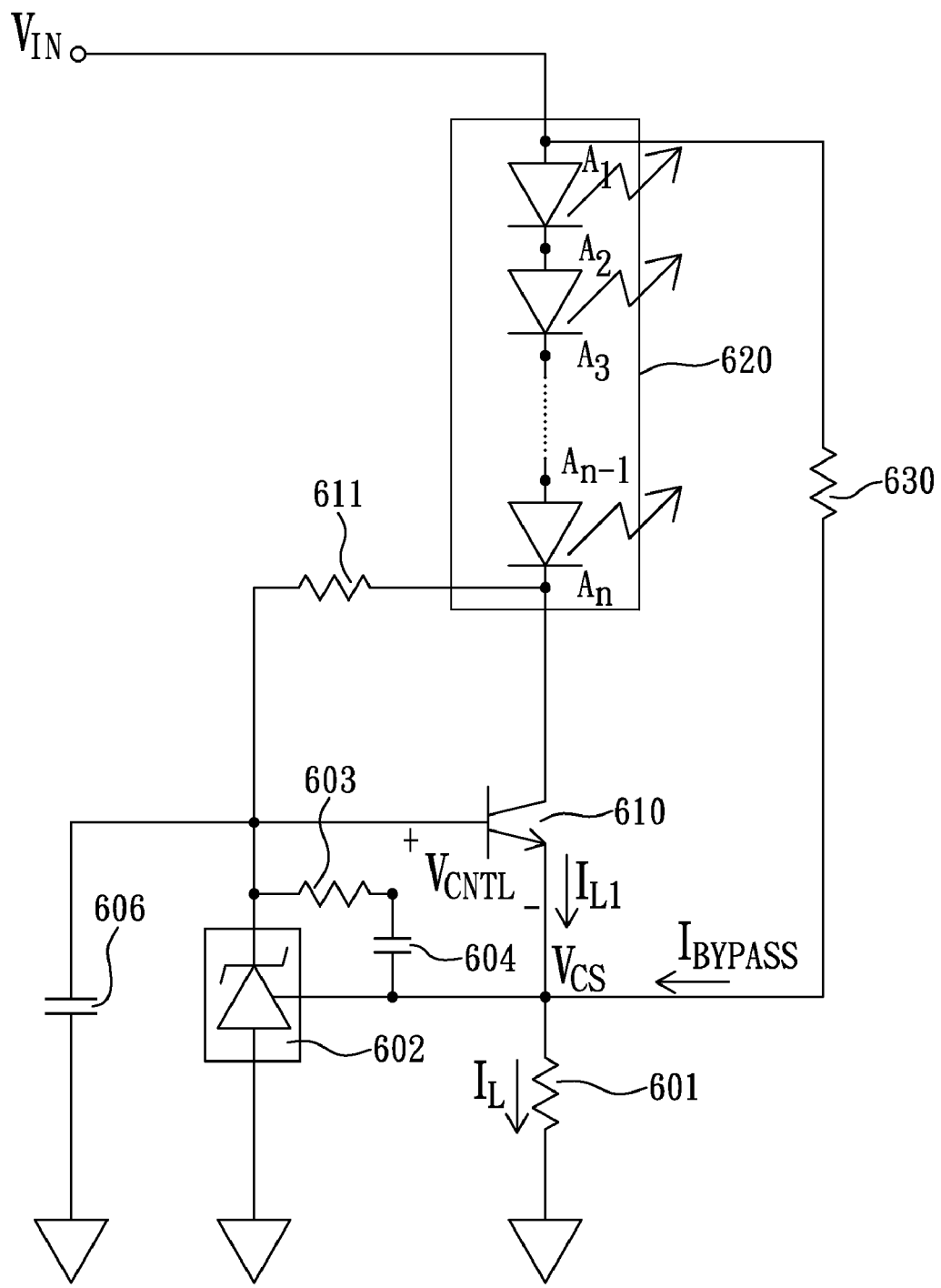
FIG. 6 illustrates the circuit diagram of a novel LED driver circuit according to another preferred embodiment of the present invention.

Please refer to FIG. 6, which illustrates the circuit diagram of a novel LED driver circuit according to another preferred embodiment of the present invention. As illustrated in FIG. 6, the LED driver circuit includes a resistor 601, a shunt regulator 602, a resistor 603, a capacitor 604, a capacitor 606, a NPN transistor 610, a resistor 611, a LED module 620, and a resistor 630.

The resistor 601 is used to generate a current sensing voltage $V_{is}$ according to a current $I_L$ ($=I_{L1}+I_{BYPASS}$).

The shunt regulator 602 has an input end coupled to the current sensing voltage $V_{CS}$ and an output end coupled to the base terminal of the NPN transistor 610, wherein the voltage at the output end is an inverting amplification of the difference of the current sensing voltage $V_{CS}$ and a reference voltage (provided inside the shunt regulator 602).

The resistor 603 and the capacitor 604 are used for frequency compensation of the shunt regulator 602.

The capacitor 606 is used for building up a stable bias voltage at the base terminal of the NPN transistor 610.

The NPN transistor 610, a high voltage NPN transistor, is used to provide $I_{L1}$ according to a voltage difference $V_{CNTL}$ between the base terminal and the emitter terminal of the NPN transistor 610.

The functions of the resistor 611, the LED module 620, and the resistor 630 are same as those of the resister 411, the LED module 420, and the resistor 430 in FIG. 4, so they will not be elaborated upon here.

When in operation, the shunt regulator 602 will vary the voltage of $V_{CNTL}$ in response to the difference of the current sensing voltage $V_{CS}$ and the reference voltage (provided inside the shunt regulator 602) to vary the current of $I_{L1}$, so as to regulate the current sensing voltage $V_{CS}$. That is, the current of $I_{L1}$ will be decreased (increased) by this negative feedback mechanism when $V_{CS}$ is above (below) the reference voltage.

Figure 7:
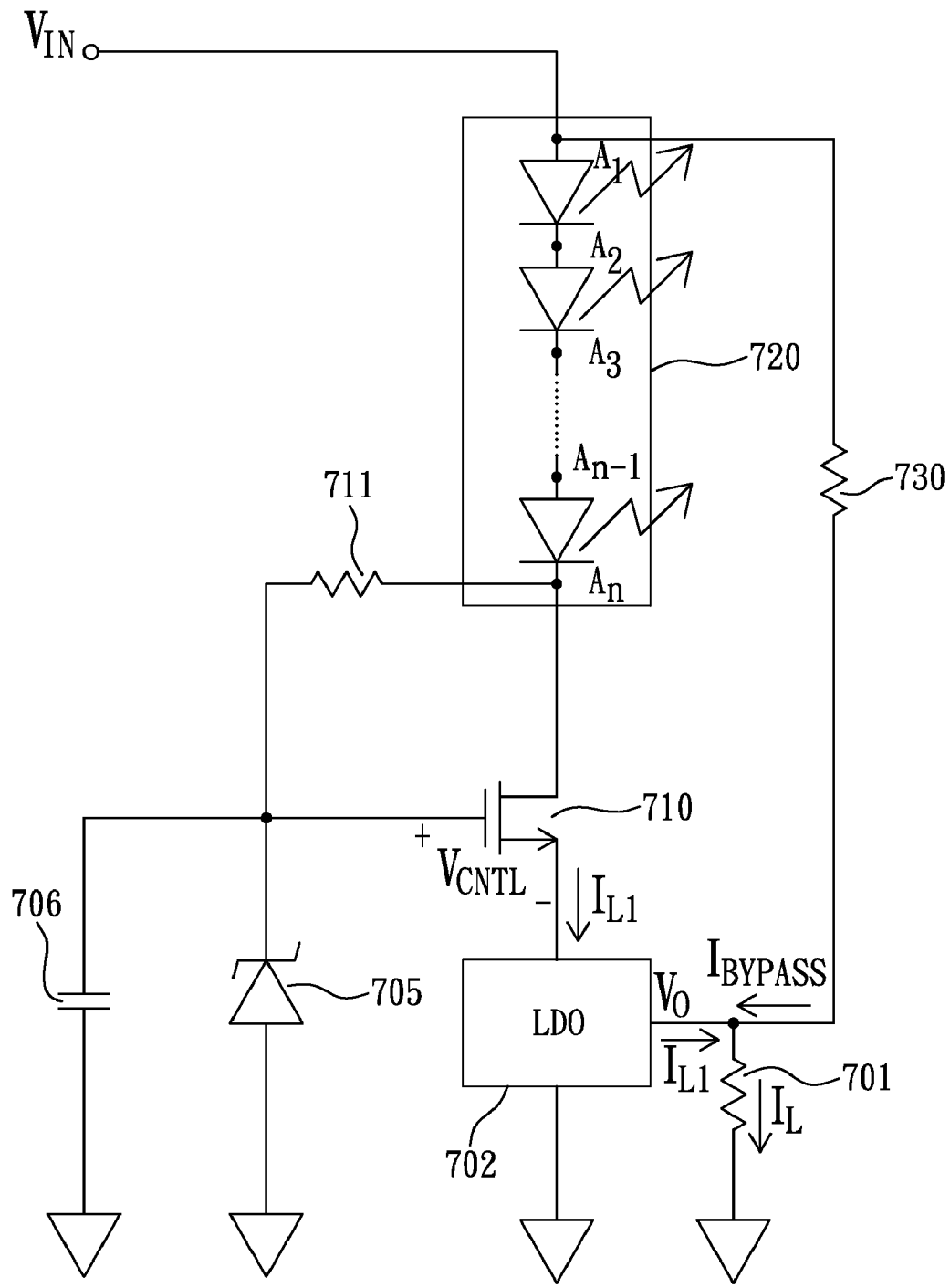
FIG. 7 illustrates the circuit diagram of a novel LED driver circuit according to still another preferred embodiment of the present invention.

Please refer to FIG. 7, which illustrates the circuit diagram of a novel LED driver circuit according to still another preferred embodiment of the present invention. As illustrated in FIG. 7, the LED driver circuit includes a resistor 701, a LDO regulator 702, a zener diode 705, a capacitor 706, a NMOS transistor 710, a resistor 711, a LED module 720, and a resistor 730.

The resistor 701 is used as a voltage-to-current converter to generate a current $I_L$ ($=I_{L1}+I_{BYPASS}$) in response to an output voltage $V_O$ of the LDO regulator 702.

The LDO regulator 702 has an input end coupled to the NMOS transistor 710 and an output end coupled to the resistor 701 and the resistor 730, wherein the voltage $V_o$ at the output end is regulated at a constant value. As such, $I_L$ ($=I_{L1}+I_{BYPASS}$) is regulated at a constant value.

The zener diode 705 and the capacitor 706 are used for building up a stable bias voltage at the gate terminal of the NMOS transistor 710.

The NMOS transistor 710, a high voltage enhancement-mode NMOS transistor, is used to provide $I_{L1}$ according to a voltage difference $V_{CNTL}$ between the gate terminal and the source terminal of the NMOS transistor 510.

The functions of the resistor 711, the LED module 720, and the resistor 730 are same as those of the resister 411, the LED module 420, and the resistor 430 in FIG. 4, so they will not be elaborated upon here.

When in operation, the LDO regulator 702 will vary the voltage of $V_{CNTL}$, and thereby vary the current of $I_{L1}$, so as to regulate $V_O$. That is, the current of $I_{L1}$ will be decreased (increased) by this regulation mechanism when the voltage of $V_O$ is above (below) the constant value.

Figure 8:
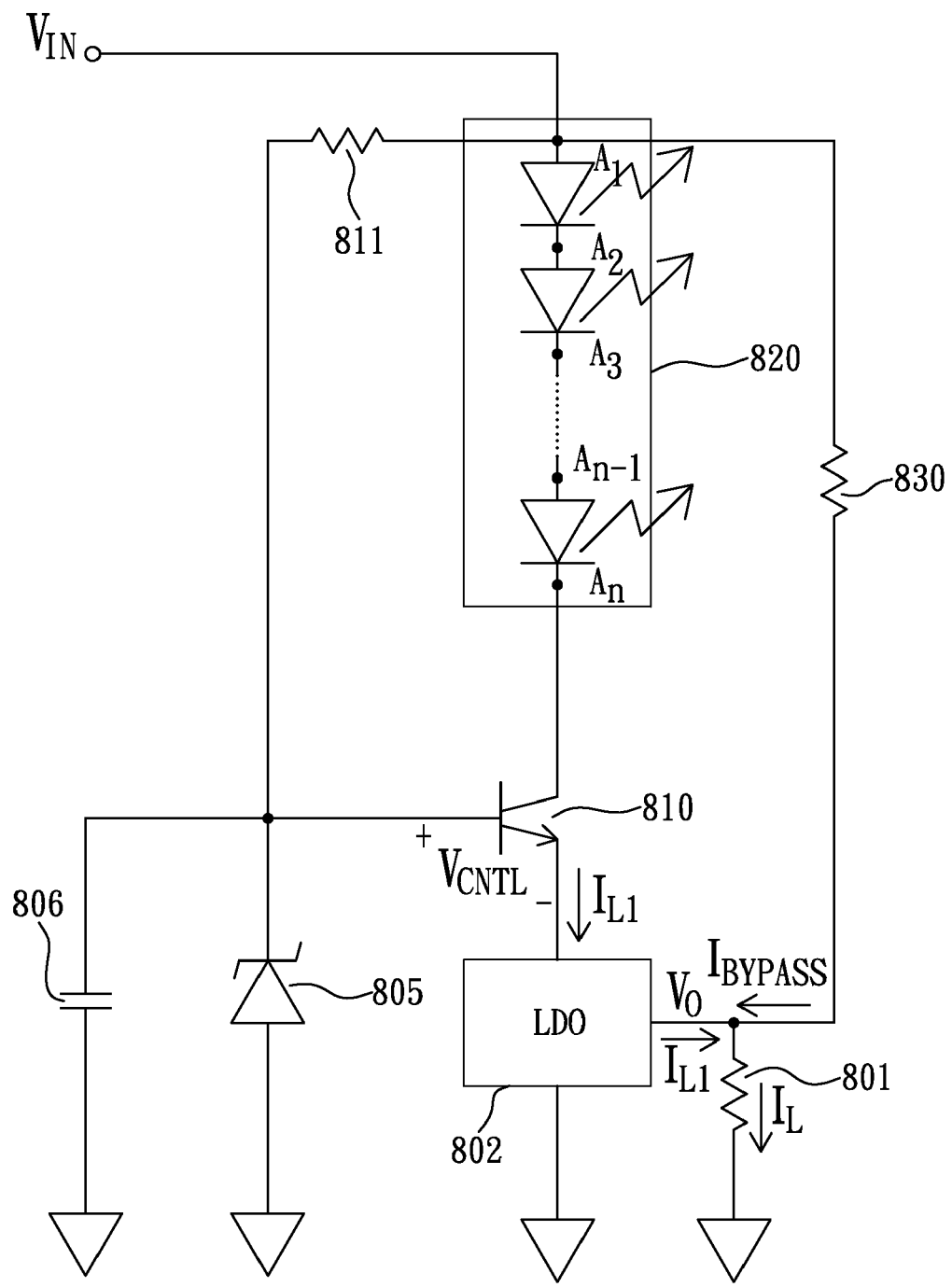
FIG. 8 illustrates the circuit diagram of a novel LED driver circuit according to still another preferred embodiment of the present invention.

Please refer to FIG. 8, which illustrates the circuit diagram of a novel LED driver circuit according to still another preferred embodiment of the present invention. As illustrated in FIG. 8, the LED driver circuit includes a resistor 801, a LDO regulator 802, a zener diode 805, a capacitor 806, a NPN transistor 810, a resistor 811, a LED module 820, and a resistor 830.

The resistor 801 is used as a voltage-to-current converter to generate a current $I_L$ ($=I_{L1}+I_{BYPASS}$) in response to an output voltage $V_o$ of the LDO regulator 802. The LDO regulator 802 has an input end coupled to the NPN transistor 810 and an output end coupled to the resistor 801 and the resistor 830, wherein the voltage $V_o$ at the output end is regulated at a constant value. As such, $I_L$ ($=I_{L1}+I_{BYPASS}$) is regulated at a constant value.

The zener diode 805 and the capacitor 806 are used for building up a stable bias voltage at the base terminal of the NPN transistor 810.

The NPN transistor 810, a high voltage NPN transistor, is used to provide $I_{L1}$ according to a voltage difference $V_{CNTL}$ between the base terminal and the emitter terminal of the NPN transistor 810.

The functions of the resistor 811, the LED module 820, and the resistor 830 are same as those of the resister 411, the LED module 420, and the resistor 430 in FIG. 4, so they will not be elaborated upon here.

When in operation, the LDO regulator 802 will vary the voltage of $V_{CNTL}$, and thereby vary the current of $I_{L1}$, so as to regulate $V_O$. That is, the current of $I_{L1}$ will be decreased (increased) by this regulation mechanism when the voltage of $V_O$ is above (below) the constant value.

As can be seen from the specification above, the implementation of the novel LED driver circuit of the present invention not only can regulate the load current but also can provide a TRIAC holding current path. Besides, as the transistor of the present invention is implemented with a high voltage enhancement-mode NMOS transistor or a high voltage NPN transistor, the current regulation circuit below the transistor can be implemented with low voltage components to reduce the manufacturing cost. Therefore the present invention does improve the prior art LED driver circuits.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

In summation of the above description, the present invention herein enhances the performance than the conventional structure and further complies with the patent application requirements and is submitted to the Patent and Trademark Office for review and granting of the commensurate patent rights.

What is claimed is:
1. A novel LED driver circuit, comprising:
a current regulation circuit, having a first end and a second end, wherein a first current is flowing into said second end, and a voltage difference between said first end and said second end is generated according to said first current in a way that said voltage difference becomes larger/smaller as said first current decreases/increases;
a transistor, having a first end, a second end, and a third end, wherein said second end is coupled with said first end of said current regulation circuit, and said third end is coupled with said second end of said current regulation circuit;
a bias network, having a first end and a second end, said second end being coupled with said second end of said transistor; and
a LED module, having at least two connection nodes, wherein the connection node at one end of said LED module is coupled to a line voltage, the connection node at the other end of said LED module is coupled to said first end of said transistor, and one of said at least two connection nodes is coupled with said first end of said bias network.

2. The LED driver circuit as claim 1, wherein said current regulation circuit comprises a shunt regulator and a current sensing resistor.

3. The LED driver circuit as claim 1, wherein said current regulation circuit comprises a resistor for voltage-to-current conversion, and a LDO regulator.

4. The LED driver circuit as claim 1, wherein said transistor is an enhancement-mode NMOS transistor or an NPN transistor.

5. The LED driver circuit as claim 1, wherein said bias network comprises a resistor.

6. The LED driver circuit as claim 1, wherein said bias network comprises a resistor and said bypass network comprises a resistor.

7. A novel LED driver circuit, comprising:
- a current regulation circuit, having a first end, a second end, and a third end, wherein a first current is flowing into said second end, a second current is flowing into said third end, and a voltage difference between said first end and said second end is generated according to the sum of said first current and said second current in a way that said voltage difference becomes larger/smaller as the sum of said first current and said second current decreases/increases;
- a transistor, having a first end, a second end, and a third end, wherein said second end is coupled with said first end of said current regulation circuit, and said third end is coupled with said second end of said current regulation circuit;
- a bias network, having a first end and a second end, said second end being coupled with said second end of said transistor;
- a LED module, having at least two connection nodes, wherein the connection node at one end of said LED module is coupled to a line voltage, the connection node at the other end of said LED module is coupled to said first end of said transistor, and one of said at least two connection nodes is coupled with said first end of said bias network; and
- a bypass network, having a first end coupled to said line voltage, and a second end coupled to said third end of said current regulation circuit.

8. The LED driver circuit as claim 7, wherein said current regulation circuit comprises a zener diode, a shunt regulator, and a current sensing resistor.

9. The LED driver circuit as claim 7, wherein said current regulation circuit comprises a zener diode, a resistor for voltage-to-current conversion, and a LDO regulator.

10. The LED driver circuit as claim 7, wherein said transistor is an enhancement-mode NMOS transistor or an NPN transistor.

* * * * *